(No Model.)
D. BARKER.
GLASS SPOON AND FORK HOLDER.
No. 305,498. Patented Sept. 23, 1884.
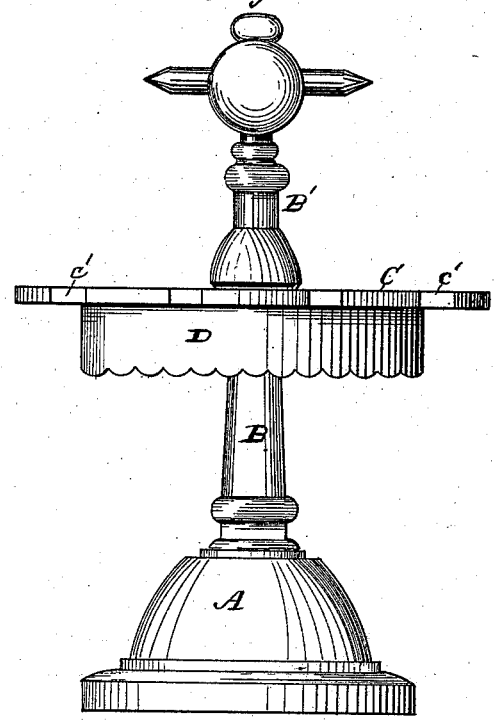
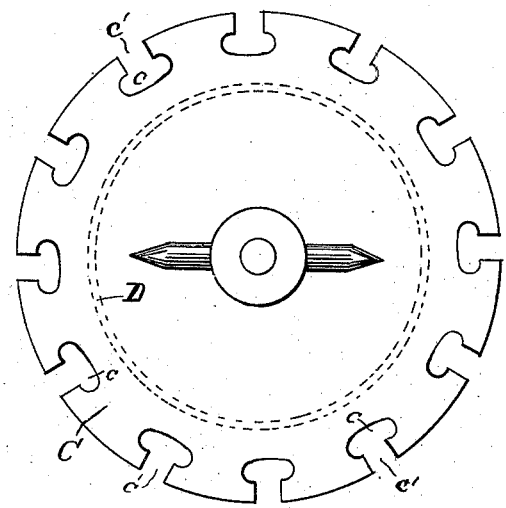
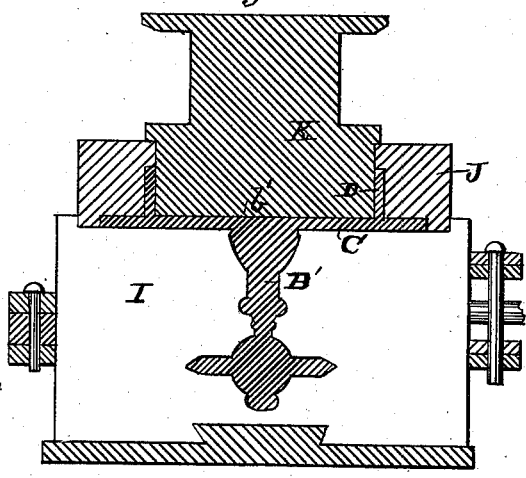
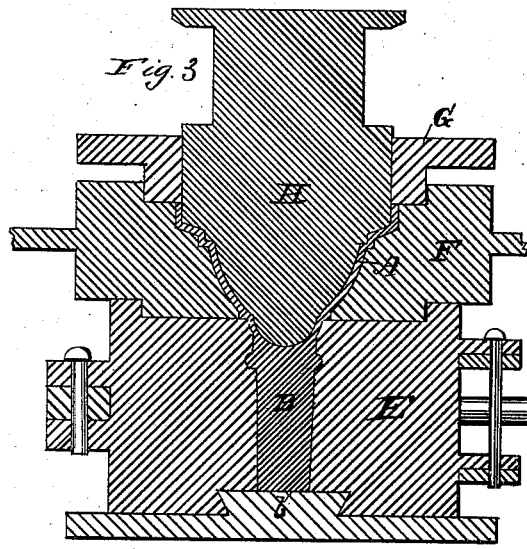

UNITED STATES PATENT OFFICE.

DAVID BARKER, OF CANTON, OHIO, ASSIGNOR TO THE CANTON GLASS COMPANY, OF SAME PLACE.

GLASS SPOON AND FORK HOLDER.

SPECIFICATION forming part of Letters Patent No. 305,498, dated September 23, 1884.

Application filed February 14, 1884. (No model.)

*To all whom it may concern:*

Be it known that I, DAVID BARKER, a citizen of the United States, residing at Canton, in the county of Stark and State of Ohio, have invented certain new and useful Improvements in Glass Spoon and Fork Holders, of which the following is a specification, reference being had therein to the accompanying drawings.

This invention relates to a novel article for table use for the purpose of holding spoons, forks, &c. Heretofore use has been made for this purpose of metal articles, or articles part metal and part glass.

The object of this invention is to provide a holder of compressed glass which can be cheaply constructed, but at the same time adapted to allow much latitude in the matter of ornamentation, and which shall have its parts so arranged as that it can be easily cleansed and shall be durable.

In the drawings, Figure 1 shows a side elevation of my improved holder. Fig. 2 is a top plan of the same. Fig. 3 is a section of the lower mold. Fig. 4 is a section of the upper mold.

A represents an expanded base or support at the bottom, above which there is a stem or shank, B.

C is a laterally-expanded plate, extending outwardly from the central stem or shank to a suitable distance, the diameter being in proportion to the number of spoons or forks which it is desired to support. The article shown is adapted to support twelve of these, the perimeter of the plate C being provided with slots or apertures *c*, situated transversely to the radius at that point, and also with radial slots *c'*, which communicate with one of the slots or apertures *c*. These slots or apertures *c c'* are so situated that a fork or spoon can have its narrower portion inserted or passed through the slot *c'*, and then by lowering it the wider or expanded upper portion of the handle will engage with the ends of the apertures *c*.

D represents a downwardly-drooping flange or web formed integrally with the glass plate C, it serving both to make the spoon-holder much more ornamental and also to strengthen the plate C, it being preferably situated at about one-half or two-thirds of the distance outward from the center to the periphery of the plate C, and therefore acting to prevent the fracture of said plate. The stem or shank is projected upwardly above the plate C, as shown at B', and at the upper end it is provided with any suitable enlargement adapted to permit the easy grasping of the holder. This may be made ornamental, or so as to serve the purpose of a flower or bouquet holder.

I am aware of the fact that holders for spoons and forks have been heretofore made of metal, which in general shape and appearance somewhat resemble mine; but I believe myself to be the first to have produced as an article of manufacture a holder or caster of this character of pressed glass adapted to meet the requirements of such an article, and shall be at once exceedingly cheap, durable, and ornamental.

I have shown in the drawings the molds which at present I prefer to use in manufacturing the holder. The lower part A B of the holder is formed in a mold having the parts E F G, those at E being two parts hinged together, that at F being a recessed plate or block fitting upon the hinged parts E, and that at G being the closing cap or ring. H is the plunger, the outer surface of which conforms to the inner surface of the portion A and to the bottom of the stem B. The upper part of the holder B' C D is formed in a mold such as shown in Fig. 4, it having also two lower hinged pieces similar to that at I, and an upper block or closing-piece, J, the latter being provided with internal annular recesses adapted to form the flange D and parts of the plate C. K is the plunger, in this case it passing through block or cap J to a suitable distance downward. After the upper and lower parts of the holder have been thus made in the molds, (shown respectively in Figs. 4 and 3,) they are joined together at points indicated at *b b'*, either by pressing together the two parts while they are sufficiently heated or by means of a third piece of glass interposed at this point.

What I claim is—

1. As a new article of manufacture, a compressed glass spoon holder or caster having the base A, the stem or shank B B', the expanded plate C, provided with the notches c, and the downwardly-extending flange or web, D, substantially as set forth.

2. The herein-described method of manufacturing glass spoon holders or casters having flanges or webs, as at D and C, lying in planes not parallel, it consisting in forming in a mold the lower part of the holder up to the horizontal plate C, forming in another mold the said plate C, the upwardly-extending stem, and the downwardly-extending flange D, and subsequently securing together the upper and lower parts by welding, substantially as set forth.

In testimony whereof I affix my signature in presence of two witnesses.

DAVID BARKER.

Witnesses:
W. W. CLARK,
JOS. K. BROWN.